United States Patent
Cousins et al.

(10) Patent No.: US 7,904,587 B2
(45) Date of Patent: *Mar. 8, 2011

(54) FLEXIBLY DEPLOYABLE COMMUNICATION DEVICE FACILITATING INTEROPERATION BETWEEN MIDDLEWARE

(75) Inventors: Peter Lawrence Cousins, Sudbury, MA (US); Desmond Carbery, Dublin (IE)

(73) Assignee: Iona Technologies Limited (BM)

( * ) Notice: Subject to any disclaimer, the term of this patent is extended or adjusted under 35 U.S.C. 154(b) by 1065 days.

This patent is subject to a terminal disclaimer.

(21) Appl. No.: 11/307,026

(22) Filed: Jan. 19, 2006

(65) Prior Publication Data

US 2006/0200567 A1  Sep. 7, 2006

Related U.S. Application Data

(60) Provisional application No. 60/644,581, filed on Jan. 19, 2005.

(51) Int. Cl.
*G06F 15/173* (2006.01)
(52) U.S. Cl. ......... 709/238; 709/246; 709/212; 709/217; 370/466; 711/121; 711/137
(58) Field of Classification Search .......... 709/223–238, 709/246, 212, 217; 715/853, 854; 707/205; 717/121, 135, 136, 137

See application file for complete search history.

(56) References Cited

U.S. PATENT DOCUMENTS

| | | | |
|---|---|---|---|
| 6,256,676 B1 * | 7/2001 | Taylor et al. | 709/246 |
| 6,282,579 B1 * | 8/2001 | Carre | 719/313 |
| 6,785,730 B1 * | 8/2004 | Taylor | 709/230 |
| 6,940,870 B2 * | 9/2005 | Hamlin | 370/466 |
| 6,993,585 B1 * | 1/2006 | Starkovich et al. | 709/228 |
| 7,200,676 B2 * | 4/2007 | Christensen et al. | 709/238 |
| 7,228,346 B1 * | 6/2007 | Allavarpu et al. | 709/223 |
| 7,363,377 B1 * | 4/2008 | Alban et al. | 709/227 |
| 7,644,184 B2 * | 1/2010 | Arora et al. | 709/246 |
| 2002/0161907 A1 * | 10/2002 | Moon | 709/230 |

* cited by examiner

*Primary Examiner* — Wing F Chan
*Assistant Examiner* — Ruolei Zong
(74) *Attorney, Agent, or Firm* — IP Authority, LLC; Ramraj Soundararajan

(57) ABSTRACT

A novel communication device (e.g., router or switch) facilitates interoperation between a plurality of middleware. The communication device has in-ports, out-ports, and a configurator. In-ports, $IP_0, \ldots, IP_m$, are associated with a middleware from a plurality of middleware and out-ports, $OP_0, \ldots, OP_n$, are associated with a middleware from the plurality of middleware. The configurator configures in-ports and out-ports based on a binding and transport of associated middleware and the novel communication device facilitates interoperation between middleware via a communication path between at least one configured in-port and at least one configured out-port, with the communication path allowing an incoming message to pass from said at least one configured in-port to said at least one configured out-port. Parameters 'm' and 'n' are chosen such that any of the following conditions are true: $m=0$ and $n \geq 1$, $m \geq 1$ and $n=0$, $m=n$, $m=1$ and $n>1$, $m>1$ and $n=1$, and $m \neq n$.

23 Claims, 2 Drawing Sheets

FLEXIBLY DEPLOYABLE COMMUNICATION DEVICE FACILITATING INTEROPERATION BETWEEN MIDDLEWARE

RELATED APPLICATION

This application claims priority to U.S. Provisional Application 60/644,581 filed Jan. 19, 2005, which is incorporated herein by reference.

FIELD OF INVENTION

The present invention relates generally to the field of middleware integration. More specifically, the present invention is related to a flexibly deployable communication device facilitating interoperation between middleware.

DISCUSSION OF PRIOR ART

Prior attempts to facilitate the integration of middleware typically introduce at least one of the following: a canonical data format; a canonical message format; a canonical protocol. The use of the term "canonical" would be understood by one of ordinary skill to include, among other features, the making of a physical copy of the information in the canonical format.

For example, some prior techniques have introduced a middleware bridge. One side of the bridge communicates using, say, middleware A; and the other side uses, say, middleware B. To allow A to communicate with B (in one direction), a mapping from A to the canonical data format has to be defined, and also a mapping from this canonical format to B. To communicate in the other direction, requires a mapping from B to the canonical format, and a mapping from the canonical format to A.

If a new middleware, say, C is introduced, then a new mapping can be introduced from C to the canonical format, and from the canonical format to C. Combined with the previous mappings, this allows: two-way communication between A to C; two-way communication between B and C; and of course two-way communication between A and B.

The number of mappings that need to be introduced is O(n+n), where n is the number of middleware products/standards that need to be allowed interoperate. It should be noted that O(x) is "of order x" and O(n$^2$) is substantially larger than O(n), especially as the value of n increases. Comparing O(n) and O(n+n) is more difficult. At first sight, O(n+n) is larger than O(n), but the proper comparison of these depends on the details. A simple cost model for O(n) is W*n+C$_1$, where W is the cost for each element of n and C is some constant cost. One O(n) approach to integration may cost W$_1$*n+C$_1$. Another approach, that is O(n+n), may cost W$_2$*(n+n)+C$_2$. Nevertheless, the former may be larger than the latter because of the higher values of W$_1$ and/or C$_1$, compared to W$_2$ and/or C$_2$. It should also be noted that the value n must also include variations in the selected middleware. That is, it needs to be increased if a middleware can support two or more data formats, message formats and/or protocols.

A disadvantage of this approach is that to communicate, say, from A and B, the data must first be translated from A into the canonical format and then from the canonical format to B.

In other previous techniques, a canonical middleware is used to integrate middleware. When, say, middleware A sends a message to middleware B, the data is transformed into the data format of a canonical middleware, and the message is transmitted using that canonical middleware's message format and protocol. In order to introduce a third middleware, say, C, a mapping from C to the canonical middleware and from the canonical middleware to C, must be defined in order to facilitate two-way communication to/from C. The number of mappings is O(n+n), where n is the number of middleware products/standards. Again, the value n must include variations in the selected middleware. A disadvantage of this approach is that to communicate, say, from A and B, that data and messages need to be translated from the data and message formats and protocols of A into the canonical data and message formats and protocols, and from these to the data and message formats and protocols of B.

Another approach to the integration of middleware is to write direct integration connectors between the various middlewares of interest. For example, if middleware A, B and C are of interest, then connections A to B, B to A, A to C, C to A, B to C and C to B could be written (or whatever subset of these that is required). A disadvantage of this approach is that the number of connections that is required is O(n$^2$).

Whatever the precise merits, features, and advantages of the above cited techniques, none of them achieves or fulfills the purposes of the present invention.

SUMMARY OF THE INVENTION

Embodiments of the present invention relate to an integration product that has some special support for the integration of multiple middleware. Throughout this document, the integration product is often referred to as "Artix" or some variant thereof. The use of the term "Artix" is for convenience and is not intended to limit the embodiments of the present invention to the specific features of a particular software product, a particular version of a software application, or a suite of software applications that now, or in the future, have been marketed or developed under the label "Artix".

In one embodiment, the present invention provides for a communication device, such as a switch, that facilitates interoperation between a plurality of middleware, wherein the switch comprises: (a) one or more in-ports, IP$_0$, . . . , IP$_m$, each in-port associated with a middleware from the plurality of middleware; (b) one or more out-ports, OP$_0$, . . . , OP$_n$, each out-port associated with a middleware from the plurality of middleware, wherein 'm' and 'n' are chosen such that any of the following conditions are true: m=n, m=1 and n>1, m>1 and n=1, and m≠n; and (c) a configurator configuring in-ports and out-ports based on a binding and transport of associated middleware. The switch facilitates interoperation between middleware via at least one communication path between at least one configured in-port and at least one configured out-port and the communication path allows an incoming message to pass from the configured in-port to the configured out-port.

In another embodiment, the present invention also provides for a server-side communication device facilitating interoperation between a server and a plurality of middleware, wherein the server-side communication device comprises: (a) one or more in-ports, IP$_0$, . . . , IP$_m$, each in-port associated with a middleware from the plurality of middleware and the in-ports facilitating interoperation between the server and the plurality of middleware; and (b) a configurator configuring the in-ports based on a binding and transport of associated middleware, and the server-side communication device facilitating interoperation between the server and a configured in-port associated with a specific middleware, wherein the communication path allowing an incoming message to pass from the configured in-port associated with the specific middleware to the server.

In yet another embodiment, the present invention provides for a client-side communication device facilitating interoperation between a client and a plurality of middleware, wherein the client-side communication device comprises: (a) one or more out-ports, $OP_0, \ldots, OP_n$, each out-port associated with a middleware from said plurality of middleware, said out-ports facilitating interoperation between said client and said plurality of middleware; and (b) a configurator configuring said out-ports based on a binding and transport of associated middleware. The server-side switch facilitates interoperation between a server and a configured in-port associated with a specific middleware, wherein the communication path allows an incoming message to pass from the configured in-port associated with the specific middleware to the server.

In yet another embodiment, the present invention provides for a communication device facilitating interoperation between a set of middleware, wherein the communication device comprises: (a) one or more in-port modules, $IP_0, \ldots, IP_m$, configurable to implement one or more in-ports, each in-port associated with a middleware from said set of middleware; (b) one or more out-ports modules, $OP_0, \ldots, OP_n$, configurable to implement one or more out-ports, each out-port associated with a middleware from said set of middleware; and (c) a configurator dynamically configuring in-ports and out-ports for an identified subset of middleware among said set of middleware, said dynamically configuration of in-ports and out-ports being based on a binding and transport of a subset of said set of middleware. The communication device facilitates interoperation between middleware via at least one communication path between at least one configured in-port and at least one configured out-port, wherein the communication path allows an incoming message to pass from the configured in-port to the configured out-port.

In one embodiment, the configurator works in conjunction with a database having configuration data to identify which in-port and out-port is to be configured. In an extended embodiment, the database additionally stores any of, or a combination of, the following: threading configuration information, implementation interceptors information, or bootstrap information.

In one embodiment, data is passed based on a pull-push model, wherein the system makes a pull call on the in-port to get a data element, and in the instance of a complex data element, the in-port makes one or more push calls on the system to pass constituent data elements of the complex data element. In another embodiment, data is passed based on a push-pull model, wherein the system makes a push call on the out-port to pass it a data element, and in the instance of a complex data element, the out-port element makes one or more pull calls on the bus to get constituent data elements of the complex data element.

Hence, the present invention integrates middleware components. Different parts of an enterprise's overall IT system use different middleware products/standards, forming middleware islands. Within a middleware island, the chosen middleware is used to integrate applications and parts of applications. However, there are challenges in communicating at an appropriate level between these islands, including: the ability to send messages between these islands (between applications running in different islands; and some times this can be viewed as being between processes running in different islands); making it easy to send these messages; higher level facilities ("ilities") such as security and transactions; and the management of a system made up of more than one island.

One aspect of the present invention is that it integrates multiple middleware islands in the same or in different enterprises.

The different middleware that Artix can integrate often use different formats for the data that they transmit, different message formats to hold this data, and/or different protocols to transmit these messages. Artix integrates middleware islands without introducing common/shared (sometimes we use the term canonical) data formats, message formats or protocols. Therefore, there is no need to introduce a canonical data format, canonical message format or canonical protocol when Artix is used to:

facilitate interoperability between a set of applications that use two or more middlewares, integrate the middleware islands in an enterprise, or to integrate multiple enterprises.

Artix consists of the Artix Bus (which is sometimes enhanced to become the Artix Runtime Bus), and other components.

Artix allows middleware to communicate without necessarily introducing a canonical data format, canonical message format or canonical protocol. Where appropriate, any of a canonical data format, canonical message format and/or canonical protocol can be introduces if this is desirable.

Artix uses APIs rather than a canonical data format, canonical message format or canonical protocol. One of the advantages of the way in which Artix supports interoperability of middleware is that, despite the ability to do this without a canonical data format, message format or protocol, the amount of work required to support n middleware products/standards can be $O(n)$ rather than $O(n^2)$.

Yet another advantage of Artix is that it involves fewer transformations between data formats, message formats and/or protocols. For example, to communicate, say, from A to B, data does not have to be transformed from A's format into a canonical data format and then from the canonical format into B's format. Instead, one transformation is all that is required: from A's format to B's format. Reducing the number of transformations give performance and other advantages.

In some sense, Artix may be thought to use a design-time canonical format: a canonical format for interface definitions. In one implementation of Artix, WSDL is used as the canonical format for interfaces. In one implementation of Artix, XML Schema is used as the canonical definition for data that is used by these interfaces as defined in the canonical format. The configurator (see later) defines mappings between the canonical interface formats (aka the logical contract), and the binding for a particular middleware interaction (aka the physical contract). Despite this, Artix avoids canonicalization of data at runtime. Thus, the Artix does not utilize traditional "canonicalization" in that a copy of information is not created during runtime.

It is also possible to write applications using the logical contracts, and these applications do not make direct use of any middleware APIs; yet the marshalling from the application layer to the middleware layer is as efficiently as applications written directly to the middleware layer. Thus, the use of the term middleware in describing the features of Artix is intended to include more than simply commercial middleware products or functionality. In contrast, as used in relation to Artix, "middleware" can refer to almost any software that generates messages to transport to a recipient.

DESCRIPTION OF THE PREFERRED EMBODIMENTS

Figure 1:
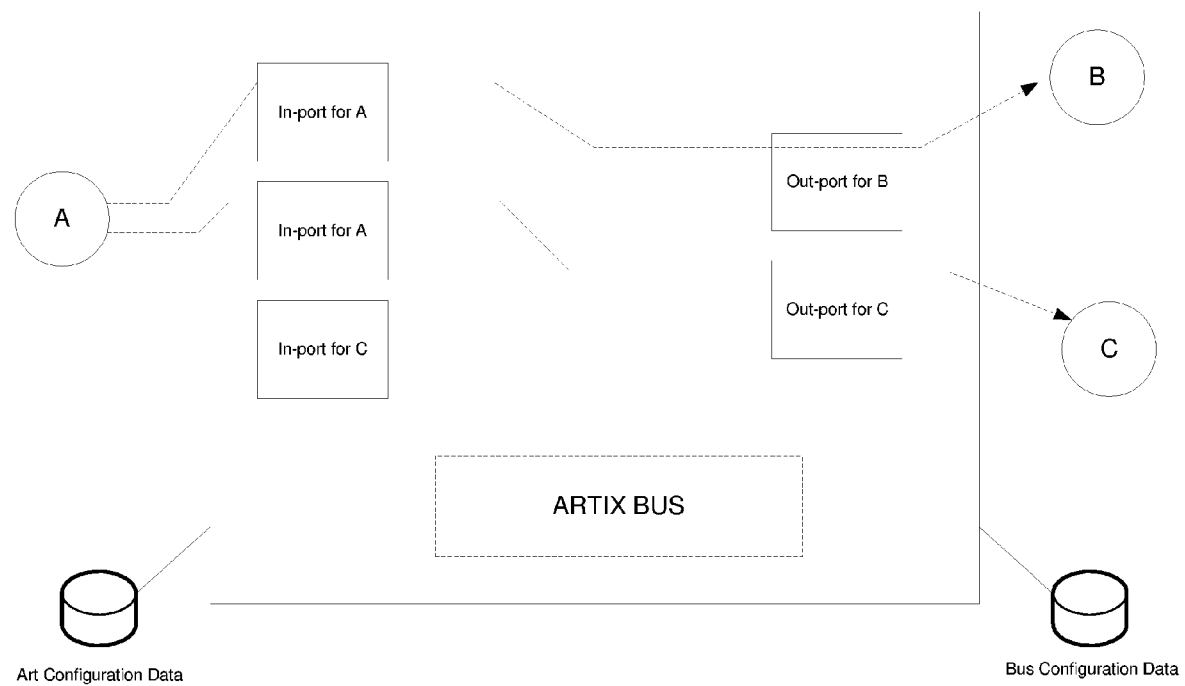
FIG. 1 illustrates an Artix Bus (or the Artix runtime bus) configured with ports to middlewares A, B and C.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that all through the specification, the term "message" has been used as an example to describe the various embodiments of the present invention. However, it should be noted that the interpretation of the present invention should not be limited by such terminology. Other equivalents, such as, block of data or intermediate canonical block of data, can be substituted without departing from the scope of the present invention.

In each use of Artix, the person who configures Artix (the configurator), specifies the middlewares that are in use in the system (more accurately, the middlewares that are to be made interoperate via Artix), and the interoperability that is required. If, say, middlewares A, B, C and D are in use, the following interoperability may be required in one example installation:
A to B, B to A, A to C, C to A, C to B, B to C and A to D, D to B The configuration choices are of order O(n2), which increases the choices for the person configuring Artix. However, as said previously, the work to extend Artix to support n middleware is O(n).

Interoperability that isn't required does not have to be included.

This has a number of advantages, such as:
  no effort is required to specify/program interoperability connections that aren't required; and
  at runtime, the size of Artix can be reduced.

FIG. 1 shows an Artix Bus (sometimes called the Artix runtime bus) configured with some ports to middlewares A, B and C. Both an in-port and an out-port are included in the case of middleware A and C, and only an out-port is shown for middleware B. Also shown are two paths, in this case from A to B, and from A to C. These paths indicates that this Artix Bus can accept calls from middleware A and route them to middlewares B or C. Two in-ports are shown for A, but the two paths may also be able to share a single in-port for A.

The ART configuration data, among other things, lists items such as when, how and from where to load the ports (e.g., what DLLs they are stored in). The ART configuration also contains information about the threading configuration (the threading configuration can include items such as: for a client, creating a thread per call or per target entity, or having a thread pool; for a server, creating a thread per call, or per target entity, or having a thread pool; there are many such configurations that would be known to one of ordinary skill in this field), implementation interceptors (that enforce policies but should not be visible in the WSDL), and bootstrap information such as pointers to the WSDL that contains the definition of the ports (both physically and logically) along with the routing table.

An in-port is a connection between a given middleware and the APIs of the Artix Bus that can handle messages (here and elsewhere, the term message is used, but various middleware uses different terminology, such as operation call, for this core concept) coming from that middleware to the Artix Bus.

An out-port is a connection between a given middleware and the APIs of the Artix Bus that can handle messages going from the Artix Bus to that middleware.

One of the benefits of Artix is there can be partial support for a middleware. For example, for a given middleware there can be an in-port and no out-port, or an out-port and no in-port. An Artix Bus has a full port for a given middleware if it has both an in-port and an out-port for it.

In a different configuration of an Artix Bus, some of the ports shown in FIG. 1 may not be configured. For example, the in-port for C may be missing. New ports could also be added, such as an out-port for A.

Sometimes we use the term connector or connection to refer to a port. We also sometimes use the term route to refer to paths.

Note that the Artix Bus does not have to deal with the data formats, message formats or protocols of the various middlewares: these are handled by the in and out-ports.

A port is made up of a binding and a transport. The binding deals with the data formatting (e.g., fixed, SOAP, tagged, and so on) and other aspects, and the transport deals with the communications protocol or middleware (e.g., HTTP, MQ, TCP/IP, IIOP, and so on) and other aspects. These can be mixed and matched: a binding for fixed format message can be combined with, say, the IIOP protocol/middleware to give one port; while another port can be got from the combination of the fixed binding and the MQ protocol/middleware.

More Sophisticated Paths

Figure 2:
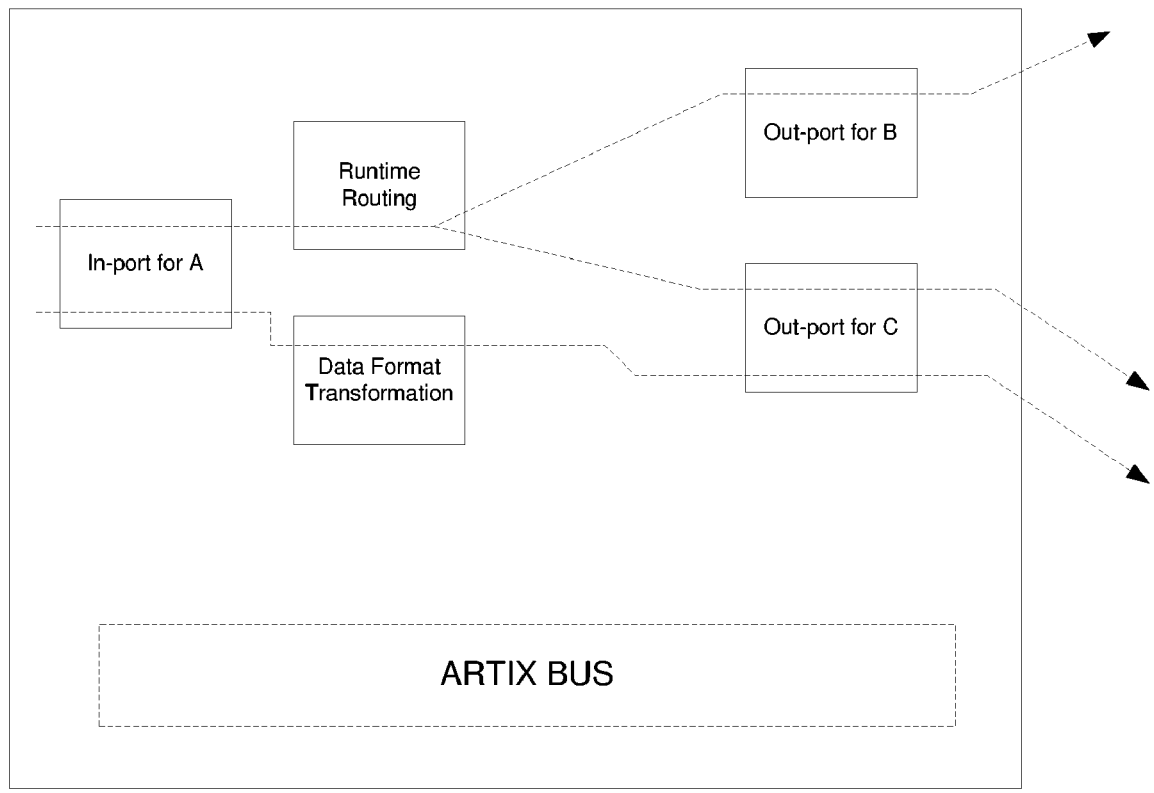
FIG. 2 illustrates sophisticated ports for data transformation and runtime routing.

As well as the paths shown in FIG. 1, more sophisticated paths can be configured to include steps such as transformation (for example, of the data, the data format or operations) and routing based on runtime data (such as the content of a message, or some table that can be updated at runtime). Two examples of these are shown in FIG. 2 (a path from A to B or C, with runtime routing that decides whether to route messages from A to B or from A to C; a path from A to C that includes a data format transformation).

A number of approaches can be taken to routing, including the following.

It can be based on the port number of an incoming message, so that all messages that arrive on a given port are sent along a specific path (or part of a path) that is configured in the routing information, It can be based on the operation name (which may be called other things, such as a subject, in some middleware), so that all incoming messages with a given operation name are sent along a specific path (or part of a path) that is configured in the routing information.

It can be based on the content of a message, so that all incoming messages with content that fulfils certain criteria are sent along a specific path (or part of a path) that is configured in the routing information.

Fan-out can be used, whereby messages are sent along multiple paths (or parts of paths) that are configured in the routing information.

Failover can be used, whereby messages are sent one available path (or part of a path) from a set of paths (or parts of paths) that is configured in the routing information. Availability can be determined in a number of ways, including: the availability of the final destination of a message; the availability of some or all of the entities between the router and the final destination.

These and other approaches can be mixed. For example: port and operation routing can be mixed; port, operation and content routing can be mixed; failover and fan out can be mixed; failover and content can be mixed.

Also, the router is a separate component of Artix; it does not have to be configured to be present at all, thus simplifying the Artix installation and removing overhead.

In one embodiment, paths are implemented using interceptor chains on a technology such as ART. As well as ports (bindings and transports), a path may also contain other elements such as: transformers, runtime-routers, load-balancing elements, fault tolerance elements, "ility" elements, session management elements, orchestration controllers (for example, to implement BPEL), and so on. A path may also contain user-supplied elements (such as those to: enhance security; propagate transaction information and/or control transaction boundaries; and so on). Interceptors provide an efficient policy-enforcement mechanism, but also encapsulate certain technical artefacts from the application layer. This is because middleware specific behaviour can be contained in the interceptors. Interceptors function at either the request level or the transport level, which provides different views of the request context that the interceptor manipulates.

Request level interceptors are able to use the XMLSchema APIs to access the request payload as discrete structures and elements, which allows them to make decisions based upon, or to alter the content of the request. The XMLSchema API system prevents them from being tied to the syntax of a particular message format, without having to physically canonicalize the request payload.

Message level interceptors act at the byte-stream view of the request payload. This allows them to perform bulk operations such as hashing, code-page conversion, compression, encryption, encoding, and digital signatures.

The interceptor chains are assembled by consulting the annotations in the service contract (e.g., extensors in the WSDL), plus non-contractual implementation strategy details (e.g., the ART configuration), but the chains can be expanded or reordered programmatically during initial assembly of the chain.

Some of the Ways of Using Artix

Among other ways, Artix can be used in the following five ways (and these uses can be combined):
a. As a switch between different middleware. Typically in this usage, there will be one or more in-ports and one or more out-ports, with the possibility of having other path elements.
b. (Embedded in clients) To allow clients to be built directly on it. Typically, in this usage, there will be one or more out-ports (with the possibility of having other path elements), and a client directly uses the Artix APIs to send messages.
c. (Embedded in servers) To allow servers to be built directly on it. Typically, in this usage, there will be one or more in-ports (with the possibility of having other path elements), and a server directly uses the Artix APIs to receive messages.
d. (Co-located with clients) This functionality is similar to the "switch" arrangement but the Artix environment is co-located on the same machine as the client application.
e. (Co-located with the servers) This functionality is similar to the "switch" arrangement but the Artix environment is co-located on the same machine as the server application.

The remainder of this section discusses these in more detail. It is also expressly contemplated that more than one Artix environment may be utilized concurrently such that a combination of the above arrangements can be in place in a particular enterprise architecture.

A switch can be in-process with one of the processes that are communicating, or in a different process sitting logically in the middle between some communicating processes. In discussing the use of Artix as a "switch" it should be kept in mind that similar behaviour applies to the last two arrangements described above in which the Artix environment is co-located with either the client or the server.

The switch can operate in a number of ways, including:

Traditional hub-and-spoke in which the intermediary accepts all inputs (i.e., has all in-ports) and can forward messages to all outputs (i.e., has all out-ports).

It can have one in-port, to middleware MI, and many out-ports. This allows services available on many middlewares (those for which an out-port is configured) to be made available to applications that can make calls to applications via MI. For example, where MI is SOAP/Web-services, this Artix configuration becomes similar in capability to IBM's WSF.

It can have many in-ports and one out-port, MO. This allows services implemented in a wide range of middlewares (those for which an in-port is configured) to use the services provided by applications that can be communicated with via MO. This is useful in many situations. For example, a well established service available over middleware MO, can be made available to further applications without proliferating MO. Instead, it can be accessed using a range of other middlewares.

It can have many in-ports and many out-ports.

As a special case of using Artix, applications can be built directly on top of it instead of directly on top of a specific middleware. Artix provides such applications (both clients and servers, as explained above) with APIs that allow them to be written independently of the middleware or middlewares that are actually underneath. A client application can use the Artix APIs to send messages, without concern for which the middleware or middlewares are actually used to transmit its messages and accept replies/messages coming to it. The middleware or middlewares can be changed by reconfiguring Artix. Similarly, a server application can use Artix APIs to receive message, without concern for the middleware or middlewares that are actually used to accept its messages and send replies/messages.

The API used by clients and servers are model driven. They contain no artefacts that reveal the underlying middleware. (In contrast, middleware products offer APIs that reveal the middleware in use. CORBA functions, for example, have extra parameters that are of special CORBA types, and hence reveal that the functions are making use of CORBA.) The Artix APIs are generated from the contracts (defined, for example, in WSDL, or defined in some middleware's native interface definition mechanism and understood by Artix). Artix APIs in JAVA adhere to the JAX-RPC standard; Artix APIs in C++ adhere to the corresponding Object Management Group's (OMG) C++ standard.

This means that users of Artix APIs need not be aware: of what middleware is in use; that any middleware is being used (i.e., the calls look like normal in-process calls); or that Artix is being used. However, Artix APIs normally have extensions (extra functions) that offer advanced features/controls, and the use of these does reveal that Artix is being used, but the choice of underlying middleware is not always revealed. The configuration choices described in this section and others are made by configuring the Artix Bus. No programming steps are required to carry out this configuration as long as the necessary ports are available. Configuration changes can be made before an Artix Bus is started, or after it has been started (either by: stopping it, making the changes and re-starting it; or while it is still running).

These choices make it easier to fit Artix into the architecture of the IT system (or part of it) of an enterprise (or group of enterprises), rather than having to modify the architecture of the IT system to suit Artix.

How the Artix Bus Works

The Artix Bus can be used to pass data from an in-port to an out-port (and hence, for example, from one middleware to another). It can directly pass the data across, or it can perform certain actions on the data, such as transforming it in various ways. The Artix Bus can also be configured to route data in various different ways: for example, it can have a routing table that informs it of what out-port it should send certain data to.

In a simple form, the Artix Bus can be configured with one in-port, and this can be in-process with either a client or a server.

In a simple form as a switch, the Artix Bus gets data from an in-port and passes it to an out-port. All of the data in an incoming message can be passed from an in-port to an out-port in one step; or the data can be passed across in a number of parts, one or more parts at a time. A common way to achieve the latter is for the Artix Bus to pass one top-level element of a message at a time from an in-port to an out-port; yet another way is for it to pass single data elements, or small groups of these, at a time.

In one implementation, the Artix Bus makes a call to an in-port to get (to pull) one element of data, and then it makes a call on the out-port to push that data element to it. (It is obvious to one of normal skill in this area, that this data flow could be implemented in other ways, for example: the data could be passed from the in-port to the Artix Bus by the former making a call on the latter; and also that the data could be passed from the Artix Bus to an out-port by the latter calling the former.)

In one implementation of the Artix Bus, a pull-push model is used to pass data from an in-port to the Artix Bus. The Artix Bus makes a pull call on the in-port to get a data element; but if this is a complex data element then the in-port makes one or more push calls on the Artix Bus to pass it the constituent data elements of the overall complex data element.

In one implementation of the Artix Bus, a push-pull model is used to pass data from the Artix Bus to an out-port. The Artix Bus makes a push call on the out-port to pass it a data element; but if this is a complex data element then the out-port makes one or more pull calls on the Artix Bus to get the constituent data elements of the overall complex data element.

The Artix Bus does not hold the data in a canonical format. There are a number of reasons for this:

The Artix Bus does not have to deal with the data of full messages as a unit, but instead it can handle the data in a message as a number of parts, one part at a time. Data can be passed from an in-port to the Artix Bus one part (to various granularities) at a time (in some cases, without copying); and from the Artix Bus to an out-port one part at a time. In these cases, the Artix Bus does not have to define any rules for how a set of data elements are stored to make up a message; for example, it does not have to serialise these data elements into an overall message. It does not have to deal with issues such as byte alignment or padding. That is, it does not have to define a canonical message format. This simplifies the Artix Bus and in/out-ports.

The Artix Bus has no knowledge of, or concern for, the details of how the primitive/basic and composite types are stored in memory; that is, their bit and byte layout. It sees them simply as programming language data values in whatever programming language it is written in (for example, C++ or Java). This bit and byte layout can vary between different programming language compilers on the same underlying machine architecture, and between different machine architectures. Even one given same programming language compiler on one given machine architecture could have different configurations/switches that could cause it to use different bit and byte layouts.

Copies of data elements, parts of messages or even whole messages do not always have to be made.

As mentioned previously, prior techniques that introduced conventional canonical formats required the use of one or more of a canonical data format, a canonical message format, or a canonical protocol when translating messages between two different middlewares. This typically involved copying a message in a first format to an intermediate message in the canonical format and then transforming that intermediate message to a third message in a second format. In contrast, the Artix bus does not have to deal with the data of a message as a contiguous unit but instead can handle the message data as a number of parts, one part at a time.

Through the use of APIs to interact with a message, the Artix bus can pass data from an in-port to an out-port one part at a time. In these cases, the Artix bus does not have to define rules for how a set of data elements (or parts) are stored to make up a message or affect performance and efficiency by making copies of the message. In other words, the Artix bus does not have to deal with issues, such as byte alignment or padding, for example, that are necessary if canonical message formats are used.

The "parts" of data that are accessed using the appropriate APIs can have different levels of granularities and may refer to, for example, a string, an integer, some more complex data type, or the entire message.

Thus, in one exemplary arrangement, applications utilizing the Artix bus are able to accept an incoming message from an underlying middleware without being concerned with the message format, data format, or protocol used to receive the data. Instead, the application receives the message independently of the underlying middleware and handles the message data as a list of data objects that are individually accessible through an API.

Yet another way in which Artix does not need a canonical format for data is seen in how it handles text-based data. In both the blocking and streaming approaches, text data is encapsulated inside small objects and is accessed by in-ports, intermediaries and out-ports via APIs. Internally within these encapsulating objects, the text-based data can be represented in different formats at different or at the same time. For example, an in-port may enter a text-based data in UTF-8 format; a first intermediary may request it in Unicode format, at which time the encapsulating object may store the data in both UTF-8 and Unicode formats; subsequent intermediaries and the out-port along the path can request the data in any format, and if the encapsulating object already has the data in the correct format then it can deliver it without further conversion. This can work for any number of encodings.

Encapsulating objects may also be configured to dispose of unwanted encodings: this is important for large text-based data, in order to avoid the wastage of memory. One method to achieve this is for an encapsulating object to be given a hint that a particular encoding is not needed further along a given path. One way to facilitate this is for each element of a path to list the encoding types that it needs; and for a configuration sub-system of the Artix bus to make this information available to the encapsulating objects, or to make calls to the encapsulating objects to let them know what data is required and what can be discarded.

How Operations are Recognized

Each in-port has a listener that recognizes the arrival of incoming messages. It is important for each to the operation of Artix that the "operation" corresponding to each message is recognized. An operation is an abstract notion, corresponding to the notion of an operation in web service's WSDL. At a high level, an operation's identifier (e.g., its name) (some middleware systems call this the subject, some call it the method name) tells the recipient of a message what part of the service that it offers is actually being used by the client that sent the message. At a lower level, an operation's identifier can be used to determine what other data is contained in a message. One example operation may have two integer parts (/parameters), while another may have many more and very complex parts.

An in-port can use a number of mechanisms for determining the operation corresponding to an incoming message, including the following amongst others:

Where all messages sent to a given in-port are of the same operation, the determination is obviously trivial.

The size of a message may determine the operation.

The message header added/managed by the middleware handled by the port may contain enough information to determine the operation. Examples include: the operation name field of an IIOP message; a Tuxedo service name; a SOAP/HTTP action header.

In some circumstances, the in-port has to parse part of the payload of a message to determine the operation. The extent of the parsing varies greatly from middleware to middleware. For the Fixed data format, there is a discriminator, which is a fixed value per operation. For XML data formatting, an XML parser (e.g., a SAX XML parser) may be required to find the XML element or elements that hold the operation identifier.

A minimal degree of parsing is advantageous as it speeds up the determination of the operation. Where parts of a message need to be parsed, the parsed data can be retained by Artix so that it is more cheaply available to code that handles the message once the operation has been determined.

Handling a Message

In some cases, Artix can handle a message without parsing/processing the payload; in other cases, it needs to do some degree of parsing/processing. These are described in the following two subsections.

No Need to Parse/Process: Pass Through

Where the data and message format of a message do not need to change, Artix can pass the message from an in-port to an out-port (passing through any intermediaries that are configured along the path) without further parsing/processing, and in some cases without having to make a copy. This would arise for example when an in-port receives a SOAP over HTTP message and the out-port is to send this as a SOAP over MQ message. In some other cases, where the format of some data part or parts do not need to be changed, Artix can pass that part or parts from an in-port to an out-port (passing through any intermediaries that are configured along the path) without any further parsing/processing, and in some cases without having to make a copy.

In some cases, Artix may not even need to know the operation that is involved. On the other hand, it may need to know this if, for example, this has been used to drive the middleware for the in-port or out-port (e.g., is it has be told to the out-port so that it can inform its underlying middleware of this).

In yet another example, Artix may also need to know the operation if there is some form of operation routing being carried out. For example, Artix could be configured to send certain of the operations from an in-port to out-port B, others to out-port C, and so on.

Need to Parse/Process: Type Driven Marshalling

The second approach is for Artix to parse/process the incoming message; and there are two ways in which this is done. They will be discussed in turn later in this sub-section. The both allow for the option of changing of the data or message format between an incoming message and the resulting outgoing message(s).

To do this, Artix depends on canonical type definitions for the data corresponding to each operation, and in one implementation of Artix it uses XML to represent these. The language of XML used is web service's WSDL (Web Services Description Language). Note that Artix does not have to use web service's data format (XML, or the XML language SOAP) to transmit or store data in a canonical format; it just needs some canonical way of describing data.

Each type in XML is defined within the context of a name space, and we use the format foo:A to refer to the type A defined in the name space foo. We sometimes use the term Qname (qualified name) to refer to a full name such as foo:A, and we sometimes use the term simple name to refer to a name such as A.

(In one implementation of Artix, we recognize that some users of Artix do not use name spaces well, and this may result in there being more than one type with the same simple name. In these cases, Artix can use the WSDL URL of the Name Space plus the simple name to constitute the Qname.)

Artix has a data structure that lists the operations that can be sent or received on each port, and, for each, the data type of each message part (the term part is used here, but the term parameter may be more appropriate for certain uses, especially for ports to or from operation-based, rather than messaging-based systems) and their ordering rules. Each part's data type is recorded as a Qname, and this acts as a reference to the data definition.

As stated in the introduction to this sub-section, there are two ways in which Artix parses the message and passes it from an in-port to an out-port. We refer to this as blocking and streaming, and they will now be discussed in turn.

Blocking

For each Qname, Artix has a type factory that knows how to create data-objects for that type. In one implementation of Artix, data-objects are of type xsd:any; and this is castable to concrete generated types. Artix has a data structure that allows it to find the correct type factory given a Qname.

The code for a type factory can either be generated from the definition of the corresponding type, or generic type factory code can be used (that is, shared code that is given the type definition at runtime and then behaves much like a type factory generated from the same type definition would behave).

The code for a data-object can either be generated from the definition of the corresponding type, or generic data-object code can be used (that is, shared code that is given the type definition at runtime and then behaves much like a data-object generated from the same type definition would behave).

When the Artix Bus is informed of an incoming message, it looks up the set of the Qnames for the message parts of the incoming message Given the Qname for each part of the message in turn, the Artix Bus asks the corresponding type factory to create a data-object, and passes this data-object to the in-port so that the data-object can be populated with values from the incoming message. In one implementation of Artix, a data-object is created for each top-most part of the incoming message; in yet another implementation, only one data-object is created for the whole incoming message; other implementations (and granularities) are also possible.

Finally, after a data-object has been populated with values from the incoming message, the Artix Bus passes the data-object to an out-port so that it can be written out.

In one implementation of Artix, the Artix Bus creates all of the data-objects for a message, and passes these at one time to an in-port so that they can be populated. In one implementation of Artix, the Artix Bus passes all of the populated data-objects for a message to an out-port in one step, so that they can be written out.

In yet another implementation of Artix, the Artix Bus creates one data-object at a time and, as each is created, passes it to the in-port so that it can be populated; once populated, it is passed to the out-port. In this way, the creation and formatting of the output data and message (and possibly the use of the underlying middleware) can take place in parallel with the processing of the input message.

One of normal skill in this area will understand that other variations in the sequence/ordering of creation/population/write-out are also possible.

Note on the Handling of Simple Types

Each in-port and each out-port knows how to handle the simple types that it can process (e.g., some subset of those defined in the xsi name space: e.g., xsi:int). In one implementation of Artix, this represents between 12 and 24 data types.

Note on the Handling of Complex Types

If a data-object is created to handle a composite type, then the in-port may recurse/call-back to the Artix Bus to complete its population. For example, if the data-object is created to read a composite value of type foo:A, and this contains a value of type bar:B, then the in-port with recurse/call-back on the Artix Bus so that a data-object can be created to handle the value of type bar:B (via the type factory for this type).

Each in-port and each output knows how to handle the "envelope" for each composite type that it handles. For example:

the data-object for a simple records/structures knows that it contains a fixed number of parts of different types. For example, the binding to handle the SOAP data format knows that each record/structure must have XML elements that enclose the overall record/structure.

the data object for a simple sequences knows that it contains a variable number of parts of the same type, and that there must be some way to determine the actual number of such part in any given sequence. For example, the binding to handle the Fixed data format knows that there must be a "count" field that gives the length of a sequence.

Note on Handing Type Extensions

If a message part is supposed to contain a type foo:A but in fact contains an extended type bar:E, then the following happens. Firstly a data-object of corresponding to type foo:A is created, but when this tries to populate itself via the in-port, the in-port notices that the actually type of data in the message is of type bar:E. A recursion/call-back to the Artix runtime then occurs so that a data-object corresponding to type bar:E is created, and it is instructed to populate itself via the in-port.

Note on the Interface to Data-Objects

The interface to a data-object is in two parts. The first part contains functions that instruct a data-object to populate itself via an in-port and to write itself to an out-port, as discussed previously. Among other uses, these are used by the Artix Bus to facilitate the interoperability of middleware.

The second part contains functions to read and write individual parts of the values held by a data-object. Among other uses, these functions are used by applications built on top of Artix. For example, an application that wishes to send a message using Artix can use the write functions to create and populate a data-object that can be delivered to an out-port.

The advantage of this for such an application is that it can construct and populate such a data-object and have it delivered to an out-port without having to be concerned with the details of the out-port, and in particular what data format, message format and/or protocols (among other details) that it uses to transmit the data. Using a list of these data-objects, an application can send a full message independently of the underlying middleware that is chosen to transmit it (by changing the out-port, the chosen middleware can be changed, without changing the application code that creates and populates the data-objects).

Another example of using these functions is for an application to be able to accept an incoming message from any underlying middleware without being concerned with the data format, message format and/or protocols (among other details) used to receive the data. An application can receive a full message independently of the underlying middleware, and handle the data as a list of data-objects.

Streaming

In yet another implementation of Artix, individual data elements, or groups of these, are passed from an in-port to an out-port. Data objects and type factories are not created to help pass a message from an in-port to an out-port along a path.

In the streaming approach, the in-port (or intermediary) [here after, the supplier] is given a functor object on which it makes a sequence of calls. As the supplier parses each data element in the message or input stream that it handles, it calls a function on the functor object. A functor object provides such a function for each of the data types that it supports, normally the basic data types (e.g., some subset of those defined in the xsi name space: e.g., xsi:int); and also for the generic complex type (such as sequences, structures/records, and so on).

Where there is no intermediary on a path, an in-port would call functions on a functor that is processed by an out-port (in one implementation of Artix, the out-port itself acts as the functor object). Artix decides creates different paths, through the in-ports and out-ports that it has configured, by giving an in-port a reference to a functor that is handled by an out-port of Artix's choosing. For example, for one operation on in-port ip1, Artix could give ip1 a reference to a functor handled by out-port op1; whereas for a different operation it could give ip1 a reference to a functor handled by out-port op2. (This is an example of operation-based routing; Artix can handle other forms of routing, as explained elsewhere).

Where there is one or more intermediaries on a path, the in-port is given a functor that is handled by a first intermediary (in one implementation, the intermediary itself acts as the functor object); which in turn is given a functor that is handled by the next intermediary; with the last intermediary given a functor that is handled by the out-port. Again, Artix can set up various paths, and use various forms of routing. For example, an in-port could call functions on a functor that is handled by a security intermediary, which in turn calls functions on a functor that is handled by a transformation intermediary, which in turn calls functions on a functor that is handled by an out-port.

One of the advantages of streaming is that it makes it easier to implement certain intermediaries in certain ways. For example, if XSLT is used to transform data, it is normal to feed it an input stream, and for it to produce an output stream. Using the blocking approach, the sequence of data objects form the in-port (or other intermediate step) would have to be transformed to a stream to feed the XSLT transformation step, and the stream that produced by the XSLT transformation step would have to be transformed back to a sequences of data objects to feed the next intermediary or the out-port.

Another advantage is data objects do not need to be created. In some cases, the creation of these objects can cause a significant overhead (depending on issues such as: the number of objects that need to be created; the size of these objects; the programming language being used; and so on).

Yet another advantages is that the system can handle operation payloads that cannot fit into memory, or cannot fit efficiently into memory.

Note on Converting from Streaming to Blocking, and Vice Versa

Mapping from s to b and b to s. Why: "old" in-ports, out-ports, intermediaries.

Artix provides support for converting from streaming to blocking, and from blocking to streaming. The streaming to blocking converter takes a stream as input (that it, it handles the calls made on a functor object) and produces a sequence of data objects. The blocking to streaming converter takes a sequence of data objects and it makes a corresponding set of calls on a functor object.

These conversions are very useful. They allow, for example, an in-port implemented using blocking to interface to a transformation step implemented using streaming (e.g., the XSLT transformation intermediary mentioned earlier). They allow, for example, a transformation intermediary implemented using streaming to feed an out-port implemented using blocking. Similarly, mismatches between consecutive intermediaries in a path can be overcome.

In some environments, streaming is the preferred approach, but where there are some in-ports, out-ports and/or intermediaries already implemented using blocking, these converters between streaming and blocking allow these to be used in an environment in which the other elements of the various paths are implemented using streaming. In addition, a development team may need to add an element to a path (for example, an in-port for a particular middleware), but may not wish to take on the additional burden of writing a streaming element, instead preferring to implement a blocking element. To fit their new element into paths that already contain one or more streaming elements, they may need to use a converter.

Another use of the converter from streaming to blocking is to allow a server directly implemented on top of the Artix APIs to see a blocking interface if it wishes, even though the last part of the path to the server is implementing using streaming.

Another use of the converter from blocking to streaming is to allow a server directly implemented on top of the Artix APIs to see a streaming interface if it wishes, even though the last part of the path to the server is implementing using blocking.

Yet, another use of the converter from blocking to streaming is to allow a client directly implemented on top of the Artix APIs to use a blocking interface if it wishes, even thought the first part of the part from the client is implementing using streaming.

Yet, another use of the converter from blocking to streaming is to allow a client directly implemented on top of the Artix APIs to use a streaming interface if it wishes, even thought the first part of the part from the client is implementing using blocking.

Some of the Optimizations Carried Out by Artix

One of the optimizations carried out by Artix is that it can pass pointers/references to data from the in-port to the out-port without copying the data that is pointed to. For example, if an incoming message has a string, then a data-object can be populated (in whole or in part) with a pointer/reference to this string rather than making a copy of the string. The out-port, when it is given this data-object, can access the original string. Avoidance of copying has a number of advantages, including: saving the effort and time required to carry this out; placing less stress on the heap (one advantages of this is that SMP machines can scale better to the task.) Great care must be taken when implementing this optimization because each middleware has different rules for when it or the code built on top of it can, will should or must deallocate (free) memory (such as the string used in the above example).

In contrast, an integration technique based on a canonical format for data at runtime must copy the incoming data into the canonical format. This not only increases the load on the processor, but it also puts a lot of stress on the heap because of all of the heap allocations and subsequent de-allocations carried out. An integration technique that uses XML as the canonical format would use, on the incoming side, an XML generator to construct the canonical format, and an XML parser, on the out going side, to access its parts. XML generators and parsers use heap allocations for each data element/attribute, and they are also very processor intensive.

Some integration techniques transmit the canonical format between processes, and possibly between machines. Artix can be assembled into a single process, and yet its paths can be dynamically (or statically) configured.

Yet another optimization carried out by Artix is that data does not always have to be re-formatted when being sent between middlewares. Consider an in-port, which handles a particular string in UTF-8, and an out-port that handles that string in Unicode. Choice of an inappropriate canonical format could result in the string being converted from UTF-8 to that format, and then to Unicode.

Consider instead that both the in-port and out-port handle the string in UTF-8. The in-port won't know that the string doesn't need to be converted in this case, because it doesn't know the identify of the out-port (which could be chosen dynamically, in any case). Use of a canonical format other than UTF-8, such as Unicode, would result in two unnecessary conversions. Instead, in Artix the string is passed—unconverted—from the in-port to the out-port (via data-objects in the blocking approach; or via the functor object in the streaming approach) in a way that allows the out-port to request the string in whatever format it needs. In our example, if the out-port requests the string in UTF-8 format then it no conversion would be required (and using the no-copy optimization, the out-port could receive a pointer to the original copy of the string). Only if the out-port requests the string in another format, Unicode for example, would a conversion need to be carried out.

This technique applies not just to strings, but to all data types. It is particularly relevant to text data because this can be large. In some cases, it is not worth applying to small binary data (such as integers).

The no-copy and no-conversion optimizations described here apply equally to intermediary steps/elements in a path, and not just to in-ports and out-ports. A string traversing a path that has intermediary steps/elements may still require no copying and no conversions. Copying and conversion will be done only as required along the path. If a string is once transformed from, say, UTF-8 to Unicode for the use by one intermediary, the other intermediaries and the final out-port can request either UTF-* or Unicode without further conversion.

In one embodiment, the present invention provides for a communication device, such as a switch, that facilitates interoperation between a plurality of middleware, wherein the switch comprises: (a) one or more in-ports, $IP_0, \ldots, IP_m$, each in-port associated with a middleware from the plurality of middleware; (b) one or more out-ports, $OP_0, \ldots, OP_n$, each out-port associated with a middleware from the plurality of middleware, wherein 'm' and 'n' are chosen such that any of the following conditions are true: m=n, m=1 and n>1, m>1 and n=1, and m≠n; and (c) a configurator configuring in-ports and out-ports based on a binding and transport of associated middleware. The switch facilitates interoperation between middleware via at least one communication path between at least one configured in-port and at least one configured out-port and the communication path allows an incoming message to pass from the configured in-port to the configured out-port.

In another embodiment, the present invention also provides for a server-side communication device facilitating interoperation between a server and a plurality of middleware, wherein the server-side communication device comprises: (a) one or more in-ports, $IP_0, \ldots, IP_m$, each in-port associated with a middleware from the plurality of middleware and the in-ports facilitating interoperation between the server and the plurality of middleware; and (b) a configurator configuring the in-ports based on a binding and transport of associated middleware, and the server-side communication device facilitating interoperation between the server and a configured in-port associated with a specific middleware, wherein the communication path allowing an incoming message to pass from the configured in-port associated with the specific middleware to the server.

In yet another embodiment, the present invention provides for a client-side communication device facilitating interoperation between a client and a plurality of middleware, wherein the client-side communication device comprises: (a) one or more out-ports, $OP_0, \ldots, OP_n$, each out-port associated with a middleware from said plurality of middleware, said out-ports facilitating interoperation between said client and said plurality of middleware; and (b) a configurator configuring said out-ports based on a binding and transport of associated middleware. The server-side switch facilitates interoperation between a server and a configured in-port associated with a specific middleware, wherein the communication path allows an incoming message to pass from the configured in-port associated with the specific middleware to the server.

In yet another embodiment, the present invention provides for a communication device facilitating interoperation between a set of middleware, wherein the communication device comprises: (a) one or more in-port modules, $IP_0, \ldots, IP_m$, configurable to implement one or more in-ports, each in-port associated with a middleware from said set of middleware; (b) one or more out-ports modules, $OP_0, \ldots, OP_n$, configurable to implement one or more out-ports, each out-port associated with a middleware from said set of middleware; and (c) a configurator dynamically configuring in-ports and out-ports for an identified subset of middleware among said set of middleware, said dynamically configuration of in-ports and out-ports being based on a binding and transport of a subset of said set of middleware. The communication device facilitates interoperation between middleware via at least one communication path between at least one configured in-port and at least one configured out-port, wherein the communication path allows an incoming message to pass from the configured in-port to the configured out-port.

When working with some middleware, the Artix Bus can be informed of the operation name, and start the Artix-controlled processing of a message, before the whole of the message has been received by the in-port (in a series of packages/chunks or in a stream) and/or processed by the in-port. With the Artix streaming approach and some variations of the blocking approach, an in-port can still be receiving and/or processing parts of an overall message, while intermediaries and possibly the out-port along a path can be processing and even transmitting earlier parts of the same message.

Additionally, the present invention provides for an article of manufacture comprising computer readable program code contained within implementing one or more modules implementing a communication device facilitating interoperation between middleware. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

CONCLUSION

A system and method has been shown in the above embodiments for the effective implementation of a flexibly deployable communication device facilitating interoperation between middleware. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of middleware programming.

What is claimed is:

1. An article of manufacture comprising a non-transitory computer storage medium having computer readable program code embodied therein implementing a communication device to facilitate interoperation between a plurality of middleware, said storage medium comprising:

(a) computer readable program code implementing one or more in-ports, $IP_0, \ldots, IP_m$, each in-port associated with a middleware from said plurality of middleware, each of said in-ports defining a connection between a given middleware and an API handling a given operation call coming from said given middleware to a bus, said in-ports identifying an operation call from said middleware, and computer readable program code implementing one or more out-ports, $OP_0, \ldots, OP_n$, each out-port associated with a middleware from said plurality of middleware, wherein 'm' and 'n' are chosen such that any of the following conditions are true: m=n, m=1 and n>1, m>1 and n=1, and m≠n, each of said out-ports defining a connection between another middleware and another API handling another operation call going from said bus to said another middleware, each of said in-port and out-port comprising a binding and a transport, said binding is at least associated with data formatting and said transport associated with at least a communications protocol or middleware;

(b) computer readable program code implementing a configurator, said configurator receiving inputs based on said identified operation call and, based on said inputs, dynamically configuring at least one in-port associated with a first middleware and at least one out-port corresponding to a second middleware, wherein said computer readable program code facilitates interoperation between said first and second middleware via at least one communication path between at least one configured in-port and at least one configured out-port, said communication path allowing an incoming message to pass from said at least one configured in-port to said at least one configured out-port, and wherein said API handles said operation call by dividing said operation call into a plurality of parts without transforming the data format of at least one of said parts into a canonical format.

2. The article of manufacture of claim 1, wherein said communication device is any of the following: a router or a switch.

3. The article of manufacture of claim 1, wherein said configurator works in conjunction with a database storing configuration data to identify which in-ports and out-ports are to be configured.

4. The article of manufacture of claim 3, wherein said database additionally stores any of, or a combination of, the following: threading configuration information, implementation interceptors information, or bootstrap information.

5. The article of manufacture of claim 1, wherein data moved over said path is represented in a plurality of different formats and an element in said path is able to request data in any of the said plurality of different formats.

6. The article of manufacture of claim 5, wherein said unwanted formats of said moved data are discarded by said system.

7. The article of manufacture of claim 5, wherein data is created in a previously unavailable format when said element in said path requests data in said previously unavailable format.

8. The article of manufacture of claim 1, wherein said in-port identifies an operation corresponding to each received message, said identification based on any of the following: size of the received message, information in the message header, or parsing a part of the payload of received message.

9. The article of manufacture of claim 8, wherein said identified operation is used to identify an optimal path among a plurality of paths or is used to decide the type of processing.

10. A server-side communication device implemented in an article of manufacture comprising a non-transitory computer storage medium having computer readable program code embodied therein facilitating interoperation between a server and a plurality of middleware, said server-side communication device, said computer storage medium comprising:

(a) computer readable program code implementing one or more in-ports, $IP_0, \ldots, IP_m$, each in-port associated with a middleware from said plurality of middleware, each of said in-ports defining a connection between a given middleware and said server, each of said in-ports comprising a binding and a transport, said binding is at least associated with data formatting and said transport associated with at least a communications protocol or middleware, said in-ports identifying an operation call from said middleware;

(b) computer readable program code implementing a configurator receiving inputs based on said identified operation call and, based on said inputs, dynamically configuring at least one in-port associated with a given middleware, said server-side communication device facilitating interoperation between said server and said at least one configured in-port associated with said given middleware via a communication path, said communication path allowing an incoming message to pass from said at least one configured in-port associated with said specific middleware to said server, and wherein said server handles said operation call by dividing said operation call into a plurality of parts without transforming the data format of at least one of said parts into a canonical format.

11. A server-side communication device facilitating interoperation between a server and a plurality of middleware, as per claim 10, wherein said server-side communication is implemented in-process with a server process.

12. A server-side communication device facilitating interoperation between a server and a plurality of middleware, as per claim 10, wherein said configurator works in conjunction with a database storing configuration data to identify which in-ports are to be configured.

13. A server-side communication device facilitating interoperation between a server and a plurality of middleware, as per claim 12, wherein said database additionally stores any of, or a combination of, the following: threading configuration information, implementation interceptors information, or bootstrap information.

14. A server-side communication device facilitating interoperation between a server and a plurality of middleware, as per claim 10, wherein said in-port identifies an operation corresponding to each received message, said identification based on any of the following: size of the received message, information in the message header, or parsing a part of the payload of received message.

15. A server-side communication device facilitating interoperation between a server and a plurality of middleware, as per claim 14, wherein said identified operation is used to identify an optimal path among a plurality of paths or is used to decide the type of processing.

16. An article of manufacture comprising a non-transitory computer storage medium having computer readable program code embodied therein implementing a dynamically configurable switch facilitating interoperation between a set of middleware, said storage medium comprising:

(a) computer readable program code implementing one or more in-port modules, $IP_0, \ldots, IP_m$, configurable to implement one or more in-ports, each in-port associated with a middleware from said set of middleware, each of said in-ports defining a connection between a given middleware and an API handling a given operation call coming from said given middleware to a bus, said in-ports identifying an operation call from said middleware, and computer readable program code implementing one or more out-ports modules, $OP_0, \ldots, OP_n$, configurable to implement one or more out-ports, each out-port associated with a middleware from said set of middleware, each of said out-ports defining a connection between another middleware and another API handling another operation call going from said bus to said another middleware, each of said in-port and out-port comprising a binding and a transport, said binding is at least associated with data formatting and said transport associated with at least a communications protocol or middleware;

(b) computer readable program code implementing a configurator dynamically configuring in-ports and out-ports for an identified subset of middleware among said set of middleware, said dynamically configuration of in-ports and out-ports being based on a binding and transport of a subset of said set of middleware, said configurator receiving inputs based on said identified operation call and, based on said inputs, dynamically configuring at least one in-port associated with a first middleware and at least one out-port corresponding to a second middleware, and said switch facilitating interoperation between said first and second middleware via at least one communication path between at least one configured in-port and at least one configured out-port, said communication path allowing an incoming message to pass from said at least one configured in-port to said at least one configured out-port, and wherein said API handles said operation call by dividing said operation call into a plurality of parts without transforming the data format of at least one of said parts into a canonical format.

17. The article of manufacture of claim 16, wherein said configurator works in conjunction with a database storing configuration data to identify which in-port and out-port is to be configured.

18. The article of manufacture of claim 17, wherein said database additionally stores any of, or a combination of, the following: threading configuration information, implementation interceptors information, or bootstrap information.

19. The article of manufacture of claim 16, wherein data moved along said path is represented in a plurality of different formats and an element in said path is able to request data in any of said plurality of different formats.

20. The article of manufacture of claim 19, wherein unwanted formats of said moved data are discarded by said dynamically configurable communication device.

21. The article of manufacture of claim 19, wherein data is created in a previously unavailable format when said element in said path requests data in said previously unavailable format.

22. The article of manufacture of claim 16, wherein said in-port identifies an operation corresponding to each received message, said identification based on any of the following: size of the received message, information in the message header, or parsing a part of the payload of received message.

23. The article of manufacture of claim 22, wherein said identified operation is used to identify an optimal path among a plurality of paths or is used to decide the type of processing.

* * * * *

UNITED STATES PATENT AND TRADEMARK OFFICE
CERTIFICATE OF CORRECTION

| | | |
|---|---|---|
| PATENT NO. | : 7,904,587 B2 | Page 1 of 1 |
| APPLICATION NO. | : 11/307026 | |
| DATED | : March 8, 2011 | |
| INVENTOR(S) | : Cousins et al. | |

It is certified that error appears in the above-identified patent and that said Letters Patent is hereby corrected as shown below:

Col. 4, line 24, delete "introduces" and insert --introduced--.
Col. 11, line 61, delete "is".
Col. 11, line 61, delete "be" and insert --been--.
Col. 15, line 8, delete "advantages" and insert --advantage--.
Col. 15, line 17, delete first instance of "it" and insert --is--.
Col. 15, line 45, delete "implementing" and insert --implemented--.
Col. 15, line 55, delete "thought" and insert --though--.
Col. 15, lines 55-56, delete "implementing" and insert --implemented--.
Col. 15, line 60, delete "thought" and insert --though--.
Col. 15, lines 60-61, delete "implementing" and insert --implemented--.
Col. 16, line 9, after "will" insert --,--.
Col. 16, line 36, delete "identify" and insert --identity--.
Col. 16, line 44, delete "it".
Col. 20, line 16, delete "and".

Signed and Sealed this
Thirty-first Day of May, 2011

David J. Kappos
*Director of the United States Patent and Trademark Office*